(12) United States Patent
Redford

(10) Patent No.: US 11,719,919 B2
(45) Date of Patent: Aug. 8, 2023

(54) AUTOMATIC REDUCTION OF SHADOWS IN SINGLE PLANE ILLUMINATION USING A SPATIAL LIGHT MODULATOR

(71) Applicant: INTELLIGENT IMAGING INNOVATIONS, INC., Denver, CO (US)

(72) Inventor: Glen Redford, Arvada, CO (US)

(73) Assignee: INTELLIGENT IMAGING INNOVATIONS, INC., Denver, CO (US)

(*) Notice: Subject to any disclaimer, the term of this patent is extended or adjusted under 35 U.S.C. 154(b) by 447 days.

(21) Appl. No.: 16/821,625

(22) Filed: Mar. 17, 2020

(65) Prior Publication Data

US 2020/0363618 A1 Nov. 19, 2020

Related U.S. Application Data

(60) Provisional application No. 62/846,963, filed on May 13, 2019.

(51) Int. Cl.
*G02B 21/36* (2006.01)
*G02B 21/00* (2006.01)

(52) U.S. Cl.
CPC .............. *G02B 21/00* (2013.01); *G02B 21/36* (2013.01); *G02B 21/367* (2013.01); *G02B 21/0032* (2013.01)

(58) Field of Classification Search
CPC ..... G02B 27/09; G02B 27/0927; G02B 21/36; G02B 21/00; G02B 21/0048; G02B 21/0076; G02B 21/006; G02B 21/0032; G02B 21/367
See application file for complete search history.

(56) References Cited

U.S. PATENT DOCUMENTS

| | | | |
|---|---|---|---|
| 2004/0184007 A1* | 9/2004 | Silverstein | H04N 5/7416 348/E9.027 |
| 2016/0327779 A1* | 11/2016 | Hillman | G02B 23/04 |
| 2018/0088305 A1* | 3/2018 | Itoh | G02B 27/0927 |
| 2018/0224644 A1 | 8/2018 | Ji et al. | |

FOREIGN PATENT DOCUMENTS

WO WO 2016/138003 9/2016
WO WO 2016/188143 12/2016

OTHER PUBLICATIONS

Becker, K. et al. "Ultramicroscopy: 3D Reconstruction of Large Microscopical Specimens" Journal of BioPhotonics; Mar. 4, 2008 https://doi.org/10.1002/jbio.200710011.
(Continued)

*Primary Examiner* — Darryl J Collins
*Assistant Examiner* — Tamara Y. Washington
(74) *Attorney, Agent, or Firm* — Jason H. Vick; Sheridan Ross, PC

(57) ABSTRACT

Methods and systems are provided that provide multiple simultaneous beams at differing angles used in scanning a light sheet for single plane illumination and applications thereof. The use of multiple beams reduces shadows that would otherwise stretch across the entire illumination sheet. The multiple beams may be created with a spatial light modulator as part of the illumination system.

20 Claims, 3 Drawing Sheets

(56) References Cited

OTHER PUBLICATIONS

Gao, Liang "Extend the Field of View of Selective Plan Illumination Microscopy by Tiling the Excitation Light Sheet" Optics Express, vol. 23, No. 5; Published Feb. 26, 2015.

Garbellotto, Chiara et al. "Multi-Purpose SLM-Light-Sheet Microscope" Biomedical Optics Express; vol. 9, Nov. 11, Nov. 1, 2018.

Huisken, Jan et al. "Even Fluorescence Excitation by Multidirectional Selective Plane Illumination Microscopy (mSPIM)" Optics Letters; vol. 32, No. 17; Sep. 1, 2007.

Jährling, N. et al. "Ultramicroscopy—A Novel Light Sheet Based Imaging Technique Created by Various Research Disciplines" Elektrotechnik & Informationstechnik; 128/10: 352-358; 2011.

Bowman, R., et al. "Efficient Generation of Bessel Beam Arrays by Means of an SLM" Eur. Phys. J. Special Topics, 199; 159-166; 2011.

Glaser, Adam K. et al. "Multidirectional Digital Scanned Light-Sheet Microscopy Enables Uniform Fluorescence Excitation and Contrast-Enhanced Imaging" Scientific Reports, vol. 8, No. 1; Sep. 17, 2018.

Lu, Yang et al. "Arrays of Gaussian Vortex, Bessel and Airy Beams by Computer-Generated Hologram" Optics Communications, vol. 363; Dec. 15, 2016.

European Search Report for European Application No. 20174162.6, dated Oct. 15, 2020.

Office Action for European Application No. 20174162.6, dated Feb. 8, 2023.

\* cited by examiner

AUTOMATIC REDUCTION OF SHADOWS IN SINGLE PLANE ILLUMINATION USING A SPATIAL LIGHT MODULATOR

CROSS REFERENCE TO RELATED APPLICATIONS

The present application claims the benefit of and priority under 35 U.S.C. § 119(e) to U.S. Provisional Application Ser. No. 62/846,963, filed on May 13, 2019, entitled "Automatic Reduction of Shadows in Single Plane Illumination Using a Spatial Light Modulator," which is incorporated herein by reference in its entirety.

BACKGROUND

Single Plane Illumination (SPI) or Light Sheet (LS) is a technique where a thin sheet of light is used to illuminate a plane at a right angle to an imaging system, such that the field that is imaged is illuminated by the plane. This provides an optical sectioning system that has many advantages, particularly in the low illumination light dose relative to other optical sectioning techniques such as confocal or multi-photon.

In other optical sectioning techniques where the illumination light is parallel to the imaging light path, shadows caused by something in the sample which blocks the illumination light will cause a small dark spot on the image. In contrast, right angle illumination as in SPI has shadows that stretch across the entire field resulting in a dark line. This makes shadows much more disruptive to the image in SPI than in other techniques.

A typical method to reduce the shadow effect in SPI images is to have multiple illumination sheets that are in the same plane but have different angles relative to each other. Thus, even if something in the sample blocks light from one sheet from reaching an area, the light from other sheets can reach that area. This greatly reduces the effect of shadows.

Many advanced techniques of SPI require beam shaping. The primary goal of these beam shaping techniques is to increase the size and decrease the thickness of the illumination sheet. Some examples of these techniques are Bessel-beams, Airy beams, tiling, and Lattice. One common method for beam shaping that allows many techniques and flexibility is to use a spatial light modulator (SLM). The SLM can be placed in the real or Fourier plane of the optical system and can be used for multiple manipulations of the illumination beam.

SUMMARY

One exemplary non-limiting embodiment of the present disclosure may be a SLM-based SPI instrument, which may add the capability of multiple sheets at different angles as is required to reduce shadows. This may require a change to the pattern presented on the SLM to create the multiple beams. In some embodiments, the multiple beams may be presented simultaneously. The change in illumination may not greatly change the total light dosage on the sample.

Furthermore, to change the angle of light coming out of an objective, the system may need to translate the beam on a back aperture of the objective. If the SLM is conjugate to the back aperture of the objective, then the system may only need to translate the beam shaping pattern on the SLM. Any translation of the pattern, in such a configuration will result in a translation at the back aperture and a change in angle of the beam at the sample. The amount of translation depends on the relay magnification between the SLM and the back aperture. The maximum amount of translation is such that the translated pattern reaches the edge of the back aperture.

In some applications, such as the simple case of a scanned Gaussian sheet, the SLM may act as the aperture. The aperture may then be translated on the SLM to change the angle of the beam at the sample. To make multiple beams at different angles simultaneously, the system may copy the beam shaping pattern and place copies translated with respect to each other on a SLM pattern. For example, if the beam shaping pattern is a circular aperture, the SLM pattern can be modified such that several copies of the circular aperture are placed side-by-side to provide several beams at different angles. Optimum shadow reduction may be obtained by maximizing the extent of the different angles of the several beams. This means that it is optimum to place the beam shaping patterns on the SLM such that the relayed patterns fall on the edges of the back aperture of the illumination objective.

One non-limiting benefit of shadow reduction using features disclosed herein is that various beam shaping methods may still be used with the multiple beams for shadow reduction. For example, tiling is a method where the focus location of the beam waist can be shifted along the illumination sheet direction of light travel. Tiling may allow multiple beam waists to be used to create a thinner, longer sheet. Tiling may be implemented by adding a Fresnel lens pattern to the SLM. The pattern may then be replicated in copies on the SLM to provide both tiling and shadow reduction. Similarly, the method of shadow reduction may be implemented using Bessel, lattice, and/or other beam shaping techniques.

Another non-limiting benefit of implementing the technique discussed above is that more light illuminating the SLM may be used to form the illumination sheet. This improves the efficiency of the illumination lightsheet use within the system. For instance, in using a flat illuminated SLM, the efficiency scales with the number of copies on the SLM.

DETAILED DESCRIPTION

Embodiments of the present disclosure will be described in connection with lightsheets, imaging systems, and related components.

Figure 1:
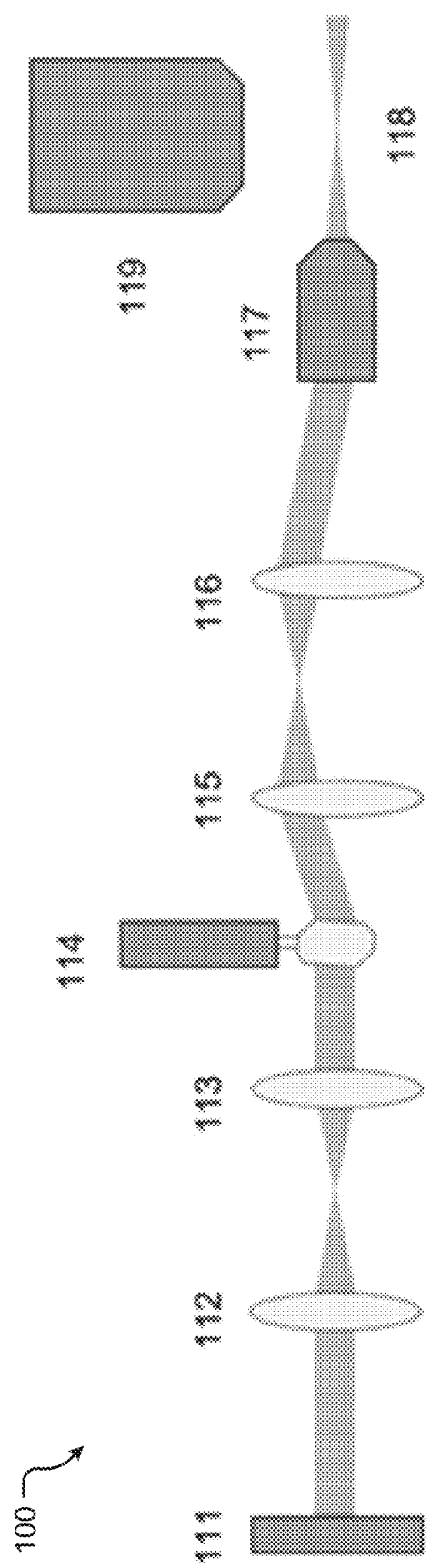
FIG. 1 shows an optical imaging system in accordance with embodiments of the present disclosure.

FIG. 1 illustrates an optical imaging system 100 in accordance with embodiments of the present disclosure. An excitation beam (not shown) may be modified by a spatial light modulator (SLM) 111. The image from the SLM 111 may be relayed using lenses 112 and 113 to a galvanometer 114. The galvanometer 114 may then be used to sweep the beam in one direction which forms a sheet. The images on the galvanometer 114 may then be relayed though lenses 115 and 116 to the back aperture of objective 117. This forms a beam waist at a sample 118. The sample 118 may then be imaged with another objective 119. The pattern on the SLM 111 may be modified to form multiple beams at the sample 118. In one embodiment, the SLM 111 is conjugate to the back pupil plane of the objective 119, and as such several beams generated on the SLM 111 may have several angles on the sample 118.

Figure 2A:
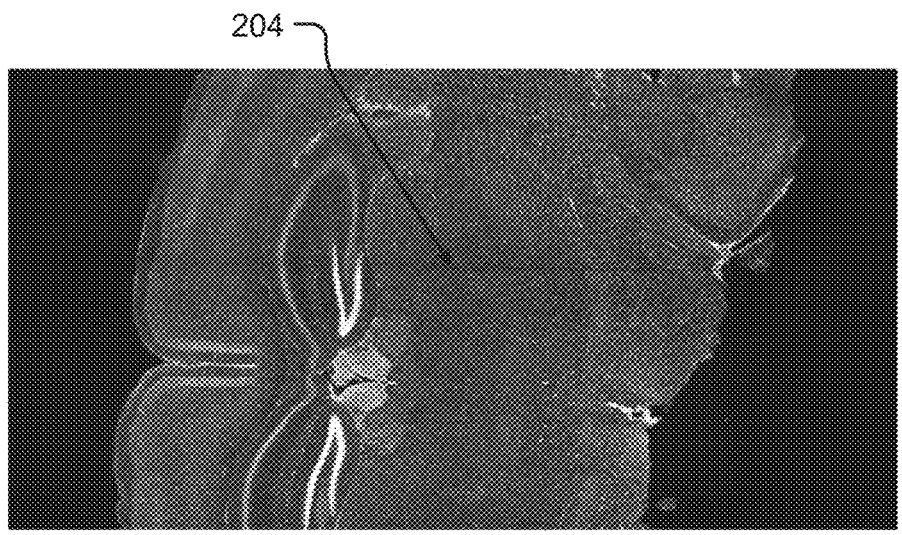
FIGS. 2A and 2B show an exemplary image produced by the optical imaging system in accordance with embodiments of the present disclosure.
Figure 2B:
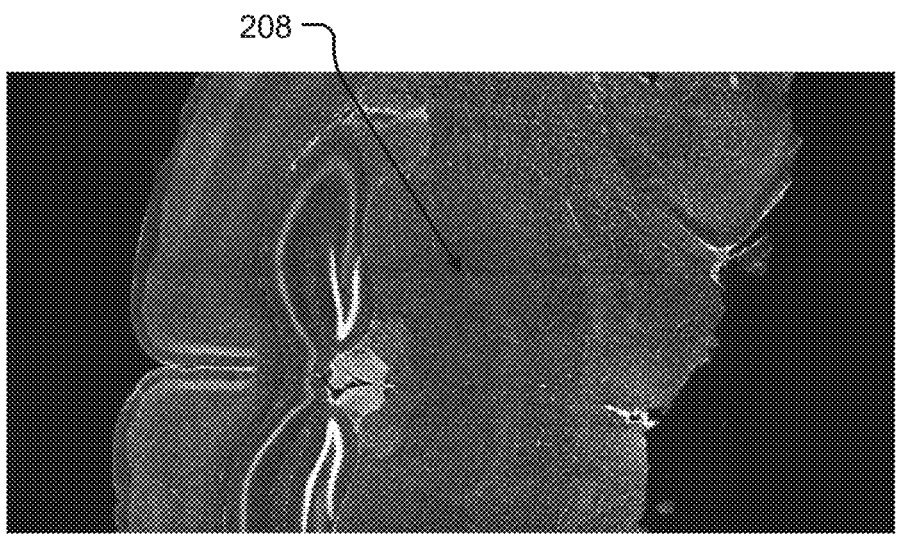

FIG. 2 demonstrates images taken with a single plane illumination (SPI) microscope. FIG. 2A illustrates an image taken using a traditional Gaussian beam to form the illumination sheet. A dark horizontal stripe 204 is caused by a shadowing artifact in the sample. FIG. 2B illustrates an image taken with shadow correction implemented. In FIG. 2B, three beams are used simultaneously at three different angles. An improved horizontal stripe 208 shows that the shadow artifact in the image is greatly reduced. Since three beams were used for shadow reduction, the depth of the shadow is reduced by approximately 33% of the original.

Figure 3:
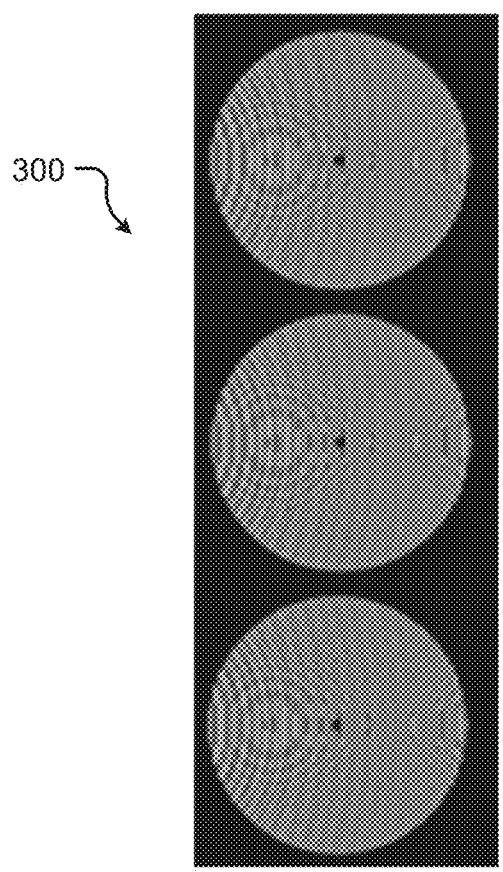
FIG. 3 shows an exemplary pattern profile for a spatial light modulator in accordance with embodiments of the present disclosure.

FIG. 3 shows an exemplary pattern profile for a binary spatial light modulator that includes the several copies that are used to generate the beams for shadow reduction. The original center pattern which sets the aperture, the angular offset, and the beam waist location is copied to generate the same beam at different angles.

Any of the steps, functions, and operations discussed herein can be performed continuously and automatically.

The exemplary techniques illustrated herein are not limited to the specifically illustrated embodiments, but can also be utilized with other exemplary embodiments. Furthermore, each described feature is individually and separately claimable.

The exemplary systems and methods of this disclosure have been described in relation to lightsheets, imaging systems, and associated components. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Aspects are thus at least directed toward:

A device that modifies an illumination beam on a light sheet for reduction of shadows due to obstructions in the sample comprising: a spatial light modulator (SLM) and a scanner, where a plane of the SLM is conjugate to a back pupil plane of an objective.

Any of the above aspects, wherein the pattern on the SLM has additional copies of the pattern in the direction of the scanned light sheet generating several beams that move through the sample at several angles.

Any of the above aspects, wherein the pattern that is copied contains modifications to generate Bessel beams or perform tiling.

Any of the above aspects, wherein the spatial light modulator is replaced with a phase plate.

A method for modifying an illumination beam of a light sheet device for reduction of shadows by modifying a pattern on a SLM of a light sheet device.

Any of the above aspects, wherein the pattern on the SLM has additional copies of the pattern in the direction of the scanned light sheet generating several beams that move through the sample at several angles.

Any of the above aspects, where the pattern that is copied contains modifications to generate Bessel beams or perform tiling.

A plurality of means for modifying an illumination beam of a light sheet device for reduction of shadows by modifying a pattern on a SLM of a light sheet device.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably and include any type of methodology, process, mathematical operation or technique.

REFERENCES (ALL INCORPORATED BY REFERENCE HEREIN IN THEIR ENTIRETY)

1. Jahrling, N. et al. "Ultramicroscopy—A Novel Light Sheet Based Imaging Technique Created by Various Research Disciplines" Elektrotechnik & Informationstechnik (2011) 128/10: 352-358.
2. Becker, K. et al. "Ultramicroscopy: 3D Reconstruction of Large Microscopical Specimens" Journal of BioPhotonics; 4 Mar. 2008 https://doi.org/10.1002/jbio.200710011.
3. Gao, Liang "Extend the Field of View of Selective Plane Illumination Microscopy by Tiling the Excitation Light Sheet" Optics Express, 23(5), 6102-6111; 2015
4. Garbellotto, Chiara et al. "Multi-Purpose SLM-Light-Sheet Microscope" arXiv:1808.03192v1 [physics.bio-ph] 6 Aug. 2018.
5. Huisken, Jan et al. "Even Fluorescence Excitation by Multidirectional Selective Plane Illumination Microscopy (mSPIM)" Opt. Lett. 32(17), 2608-2610 (2007).

What is claimed is:
1. An optical device comprising: a spatial light modulator that forms several beams that have several angles, the several beams passing through a first objective and that reduce shadows on a sample due to obstructions in the sample; and a scanner; wherein a plane of the spatial light modulator is conjugate to a back pupil plane of a(n) second objective.
2. The optical device of claim 1, wherein a pattern on the spatial light modulator has additional copies of the pattern in a direction of a scanned light sheet generating several beams that move through a sample at the several angles.
3. The optical device of claim 2, wherein the pattern that is copied contains modifications to generate Bessel beams or perform tiling.
4. The optical device of claim 1, wherein the spatial light modulator is replaced with a phase plate.
5. The optical device of claim 1, wherein the spatial light modulator outputs an image that is relayed by one or more lenses to a galvanometer.
6. The optical device of claim 1, further comprising a galvanometer that sweeps an excitation beam to form a sheet.
7. The optical device of claim 1, further comprising a galvanometer that that relays received images through one or more lenses to a back aperture of the first objective.
8. The optical device of claim 1, wherein the first objective forms a beam waist at a sample.
9. The optical device of claim 1, wherein the second objective images the sample.
10. The optical device of claim 1, wherein a pattern on the spatial light modulator is modified to form multiple beams at a sample.

11. A method for modifying an illumination beam of a light sheet device for reduction of shadows comprising: modifying a pattern on a spatial light modulator of a light sheet device, the modified pattern forming several beams that have several angles the several beams passing through a first objective and that reduce shadows on a sample due to obstructions in the sample.

12. The method of claim 11, wherein the pattern on the spatial light modulator has additional copies of the pattern in a direction of a scanned light sheet generating several beams that move through the sample at several angles.

13. The method of claim 12, wherein the pattern that is copied contains modifications to generate Bessel beams or perform tiling.

14. An optical imaging system comprising: a spatial light modulator; and means for modifying an illumination beam of a light sheet device for reduction of shadows by modifying a first pattern on the spatial light modulator of the light sheet device, the modified pattern forming several beams that have several angles that reduce shadows on a sample due to obstructions in the sample.

15. The optical imaging system of claim 14, further comprising means for outputting an image that is relayed by one or more lenses to a galvanometer.

16. The optical imaging system of claim 14, further comprising means for sweeping an excitation beam to form a sheet.

17. The optical imaging system of claim 14, further comprising one or more lenses configured to relay received images to a back aperture of an objective.

18. The optical imaging system of claim 14, further comprising a beam waist that is formed at the sample.

19. The optical imaging system of claim 14, wherein a second pattern has additional copies of the first pattern in a direction of a scanned light sheet generating several beams that move through the sample at several angles.

20. The optical imaging system of claim 19, wherein the first pattern contains modifications to generate Bessel beams or perform tiling.

* * * * *